UNITED STATES PATENT OFFICE.

WILLIAM AUGUSTUS BALDWIN, OF CHICAGO, ILLINOIS.

PROCESS OF MAKING ALUMINIUM ALLOYS.

SPECIFICATION forming part of Letters Patent No. 406,383, dated July 2, 1889.

Application filed August 21, 1888. Serial No. 283,364. (No specimens.)

*To all whom it may concern:*

Be it known that I, WILLIAM AUGUSTUS BALDWIN, a citizen of the United States, residing at Chicago, in the county of Cook and State of Illinois, have invented certain new and useful Improvements in Process of Making Aluminium Alloys; and I do declare the following to be a full, clear, and exact description of the invention, such as will enable others skilled in the art to which it appertains to make and use the same.

This invention relates to means for aluminizing metals; and it consists in the method hereinafter described and claimed.

In my United States Patent numbered 380,161, dated March 27, 1888, I have described a composition of matter adapted when fused to be used as a bath for aluminizing metals. This bath consists of clay or other earth-bearing alumina, one part; charcoal or other carbonaceous matter, one-fourth part, and sodium chloride, three parts, all by weight. These proportions are not always arbitrary, but may be varied according to circumstances. In all cases, however, the sodium chloride must be in excess of either of the other ingredients.

In my patent numbered 378,278, and dated February 21, 1888, I have described a process for aluminizing metals by fusing the bath above mentioned in one receptacle and the metal to be aluminized in another, and then mixing the metal and bath so fused together.

I find by experiment that a fusion of the compound of clay or substance bearing alumina, charcoal or carbonaceous substances, sodium chloride, and metal in separate vessels is not always desirable, and for some purposes is unnecessary. I therefore prefer, when a large amount of metal is to be aluminized, to treat the metal and compound in the method following—that is to say, I take, for example, about five pounds (more or less) of the compound and place it in a suitable vessel, but preferably a pouring vessel or ladle, and then pour about one hundred pounds of melted metal upon it. The metal fuses the compound sufficiently for ordinary purposes, and at the same time the aluminum is set free, passes upward through the fused metal, and by the affinity of the metal for the aluminum combines therewith, producing an alloy of the two metals.

It is obvious that the gases escaping from the bath will agitate the molten metal and aid materially in effecting a thorough distribution of the aluminum therein.

Heretofore in the treatment of metals a silicate has been placed in a ladle or other vessel and the cupola tapped so as to draw the molten mass upon the flux. This process, however, is not for the purpose of aluminizing metals. By my process I find that by placing the unfused compound of clay or other substances bearing alumina, sodium chloride, and carbonaceous substance in a ladle and drawing the molten metal thereon the aluminum is liberated from the clay; its particles, being the finest possible, quickly following their law of affinity, enter into combinations with the metallic molecules. The uniform distribution of the aluminum is aided in such process by the position of the compound. The gases and vapors evolved in their upward struggle through the mass of metal create currents, by which the more uniform distribution of the aluminum is effected. By these currents, also, the sulphur and other impurities resident in the metal are assisted to the surface and pass off therefrom. I also find that castings thus treated are absolutely free from blow-holes and the capacity of the cupolas is greatly increased.

Having described my invention, what I claim is—

The process described of aluminizing a metal, consisting in fusing such metal and pouring the same on an unfused compound of clay or substances bearing alumina, sodium chloride, and charcoal or other carbonaceous substances placed in a vessel or pouring-ladle, substantially as specified.

In testimony whereof I affix my signature in presence of two witnesses.

WILLIAM AUGUSTUS BALDWIN.

Witnesses:
    JAMES S. MACCOY,
    EVALYN F. STAFFORD.